Oct. 2, 1923.

V. W. PAGÉ

1,469,731

SPRING MOUNTING

Original Filed May 27, 1921

WITNESSES

INVENTOR
Victor W. Pagé

ATTORNEYS

Patented Oct. 2, 1923.

1,469,731

UNITED STATES PATENT OFFICE.

VICTOR W. PAGÉ, OF KEW GARDENS, NEW YORK, N. Y.

SPRING MOUNTING.

Original application filed May 27, 1921, Serial No. 465,052. Divided and this application filed February 7, 1922. Serial No. 534,775.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Spring Mounting, of which the following is a full, clear, and exact description.

The present invention relates to new and useful improvements in motor vehicles and it pertains more particularly to a means for mounting the rear ends of springs upon the rear axles thereof, and comprises subject matter divided from my co-pending application filed April 27, 1921, Serial No. 465,052.

It is one of the objects of the invention to provide a new and novel spring-attaching means for securing the rear end of springs to the axle housing.

It is a further object of the invention to provide a new and novel arrangement whereby the working parts of the rear axle may be thoroughly lubricated.

It is a still further object of the invention to so construct the spring suspension that the same will at all times be lubricated.

Figure 1:
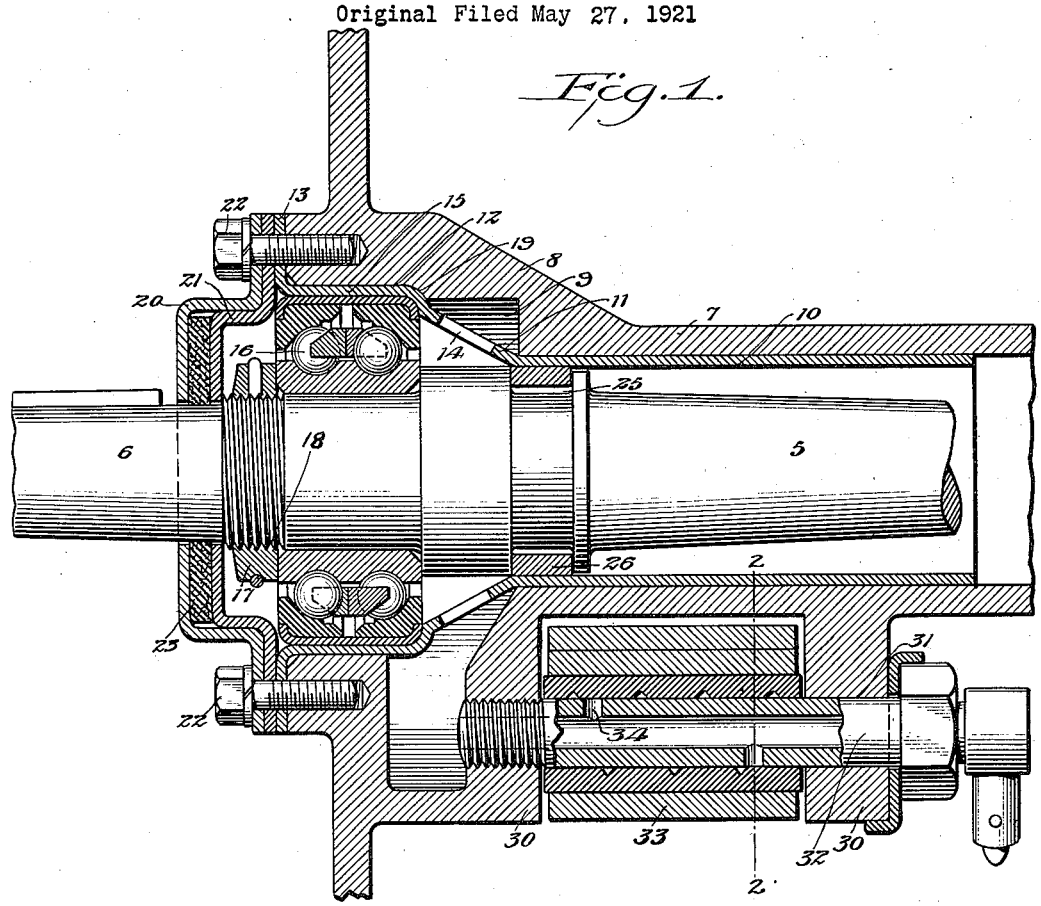
Figure 2:
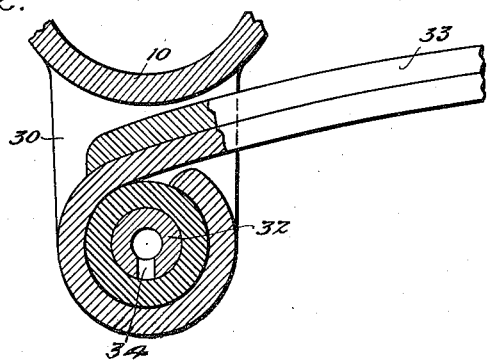

With the above and other objects in view, reference is had to the accompanying drawings, in which Figure 1 is a longitudinal sectional view of one end of a rear axle showing a new and improved form of housing constructed in accordance with the present invention;

Fig. 2 is a detail sectional view taken on the line 2—2 of Fig. 1.

Referring to the drawings by reference characters, 5 designates the axle and said axle projects beyond the axle housing as indicated at 6, to provide for the attachment of the wheels of the vehicle. The reference character 7 designates the rear axle housing, and said housing is formed of magmalite, lynnite and similar light aluminum alloys. This axle housing 7 is formed on each of its ends with an enlarged portion 8, which enlarged portion is hollowed out to provide a chamber or the like for retaining a suitable lubricant in the form of grease. The axle housing 7 is provided with a lining 10 of relatively hard material, such as steel, and said lining extends throughout the length of the axle housing and has that end positioned within the chamber 9 flared as indicated by the reference character 11. The lining 10 of the axle housing 7 is extended as indicated by reference character 12, beyond the chamber 9, and is provided with an annular flange 13, which flange is adapted to contact with its respective end of the axle housing 7. The lining 10 at the flared portion 11 is provided with a plurality of openings 14, the purpose of which will be hereinafter more specifically described.

Between that portion 11 of the axle housing lining 10 and the flange 13, the lining 10 is formed to provide a bearing seat 15 and said bearing seat 15 receives a roller bearing 16, within which the axle 5 is supported. This bearing is maintained in position in the lining 10 by means of a nut 17 threaded upon the axle as at 18, the lining 10 being shaped as indicated by the reference character 19 to form a shoulder against which the bearing 16 is forced by means of the nut 17.

The reference characters 20 and 21 designate an outer and an inner plate, respectively, and these plates 20 and 21 are flanged in order that they may be secured to their respective ends of the axle housing 7, by cap screws or the like 22. Interposed between these plates 20 and 21, is a disk 23 of felt or other suitable material, which disk serves to prevent lubricant contained within the structure from passing beyond the plate 20 to the wheel carried by the portion 6 of the axle.

The axle is cut out as at 25, and mounted in said cut-out portion 25 is a split ring of resilient metal, as indicated by the reference character 26, and said split ring is adapted to prevent lubricant from the differential housing passing from the axle housing to the bearing housing or lubricant chamber 9.

The axle housing 7 is formed with two integral depending lugs 30, and said lugs are perforated as at 31, to receive a hollow bolt 32, which bolt is adapted to support the springs 33. It is to be understood that this construction is duplicated upon the opposite ends of the axle in order that springs may be secured to each end thereof. This hollow bolt communicates with the chamber 9 in the enlarged portion 8 of the axle housing 7, and said hollow bolt is provided with perforations 34, by means of which lubricant from the receptacle 9 may pass to the springs by way of said hollow bolt 32.

From the foregoing it is apparent that the present invention provides a new and novel construction for rear axles of vehicles, which construction permits the use of light materials in the manufacture of these several parts. Furthermore, the present construction provides a new and novel method of attaching springs to the rear axle, which construction provides for the constant lubrication of the springs at their pivotal point of connection to the axle.

What is claimed is:

1. A rear axle housing formed to provide a lubricant chamber, a plurality of lugs projecting from said chamber, a bolt supported in said lugs, and a spring pivotally mounted on said bolt, said bolt being hollow and having communication with the said lubricant chamber and being perforated to permit of lubricant passing therefrom to the springs.

2. A rear axle housing formed to provide a lubricant chamber, a plurality of lugs projecting from said chamber, a hollow bolt mounted in said lugs and having communication with the lubricant chamber, and a spring mounted upon said bolt, substantially as described.

3. A rear axle housing having its ends formed to provide lubricant chambers, depending lugs formed upon each end of the axle, a plurality of springs, means for pivotally mounting said springs between the depending lugs of the axle housing, each of said spring-mounting means having communication with its respective lubricant chamber.

4. A rear axle housing formed on its ends with lubricant chambers, a plurality of lugs, a hollow bolt mounted in said lugs and having communication with its respective lubricant chamber, and means for mounting a spring on said bolt whereby the mounting of said spring may receive lubrication from the lubricant chamber.

5. A rear axle housing formed on its ends with lubricant chambers, one of the walls of said lubricant chambers being provided with a screw-threaded opening extending to the interior of the chamber, a lug on each end of the housing and spaced with respect to its respective chamber, a bolt passing through said lug and having threaded engagement with the threaded opening in the wall of the lubricant chamber, and spring attaching means carried by said bolt.

VICTOR W. PAGÉ.